Figure 1:
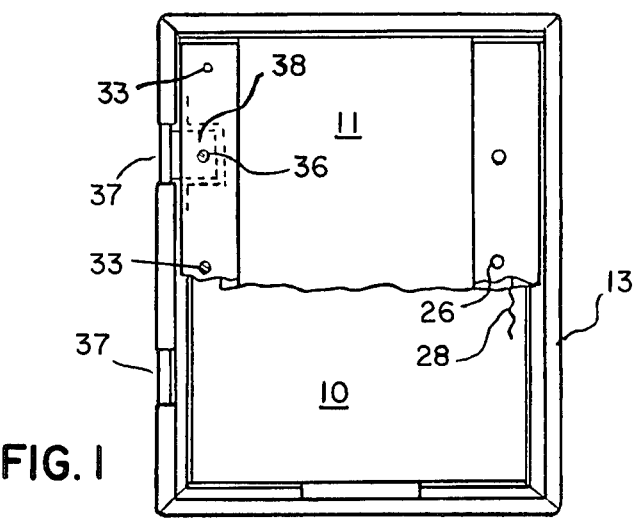

United States Patent [19]

Lancaster

[11] 4,065,828

[45] Jan. 3, 1978

[54] HINGEING ATTACHMENT

[76] Inventor: Alfred John Lancaster, 65 Bingara Rd., Beecroft, New South Wales 2119, Australia

[21] Appl. No.: 683,580

[22] Filed: May 5, 1976

[51] Int. Cl.² .......................... E05D 3/00; E05D 7/00
[52] U.S. Cl. ................................. 16/128 R; 16/137; 16/147
[58] Field of Search .................... 16/176, 128 R, 135, 16/13 Q, 140, 142, 147, 180

[56] References Cited

U.S. PATENT DOCUMENTS

| 847,717 | 3/1907 | Althin | 16/135 |
|---|---|---|---|
| 1,186,637 | 6/1916 | Williams | 16/135 |
| 2,852,802 | 9/1958 | Seby | 16/135 |
| 3,962,749 | 6/1976 | Abolins | 16/135 |

*Primary Examiner*—Werner H. Schroeder
*Attorney, Agent, or Firm*—Ladas, Parry, Von Gehr, Goldsmith & Deschamps

[57] ABSTRACT

A hinge mechanism particularly for use with X-ray film cassettes. The hinge includes two complementary radiussed members, which permit the moveable member to be guided in operation on the non-moveable member and which permit close line sealing of a closure member to which the hinge is attached.

5 Claims, 2 Drawing Figures

U.S. Patent  Jan. 3, 1978  4,065,828

HINGEING ATTACHMENT

This invention relates to a novel hinge mechanism, and particularly to a hinge mechanism adapted to provide a light- and/or air-tight seal in a variety of applications.

The hinge of the present invention is particularly adapted for use with X-ray film cassettes, where for obvious reasons it is essential to exclude light to prevent undesired exposure of the film. The hinge also prevents undesired exposure of the film. The hinge also finds application however in other areas, particularly where a close line seal of a compartment is required, as, for example, in a refrigerated cabinet such as a deep freezer.

According to the invention, a hinge mechanism comprises: A first member, and a second member movable relative to the first member; the first member having a base portion and a portion which is upstanding relative to the base portion, and which has an at least partially curved external surface, the base and upstanding portions defining a radiussed recess between them; the second member having an upper portion and integral flange portion, a free edge of the flange portion being curved, such curve preferably being complementary to that of the recess in the first member and being adapted for location in the recess; the web of the flange being radiussed in a manner complementary to the radius of the curved surface of the first member; the second member having part of its movement guided by engagement of the edge of the flange in the recess and a further part of its movement guided by engagement of the flange web on the curved surface of the upstanding portion of the first member.

The two members forming the hinge may be joined by any suitable means, for example, by hinge ties, secured to the respective hinge members.

The hinge members may be formed from any suitable material such as metal, synthetic plastics and the like. For convenience however, it has been found that hinge members of appropriate profiles can be readily fabricated from extrudable materials, such as aluminium.

In the closed position of the hinge, the flange of the second member is engaged within the recess of the first member. As the second member is pivoted relative to the first member (the second member would of course normally form part of the closure, such as a door, or lid of the container in question) such movement is guided by the edge of the flange within the radiussed recess.

As the second member pivots further, the radiussed portion of the flange leaves the recess and engages the curved surface of the upstanding portion of the first member, and is thereafter guided on such surface. Such a construction permits a door, lid, etc., to be opened to any desired position, and indeed through an angle in excess of 180°, and double-hinged in the manner of a parliament hinge.

In addition, when moving towards the closed position, the engagement of the flange initially upon the upstanding portion and finally in the recess, enables the cover to which the movable member is attached to form a hinge line as low as practicable relative to the upstanding member. Thus, as the flange engagement changes from the curved portion of the upstanding member, to engagement within the recess, during the final closing movement of the hinge, the second member, and accordingly the cover or lid, or door, to which it is attached, drops slightly, relative to the enclosure, as the flange engages within the recess.

This action results in the progressive closure of the cover or lid from the hinge side towards the opposite side of the cover, which feature is particularly useful in the case of X-ray film cassettes, since it permits the progressive expulsion of air from the cassette interior as the lid is closed.

In other applications such as refrigerator cabinets, the hinge mechanism permits the flat engagement of the door or cover to the cabinet body (and therefore sealing by means of the conventional rubber gasket employed between the door and the body) without uneven compression of such gasket adjacent to the hinge as frequently occurs with hinge mechanisms of conventional design.

Figure 2:
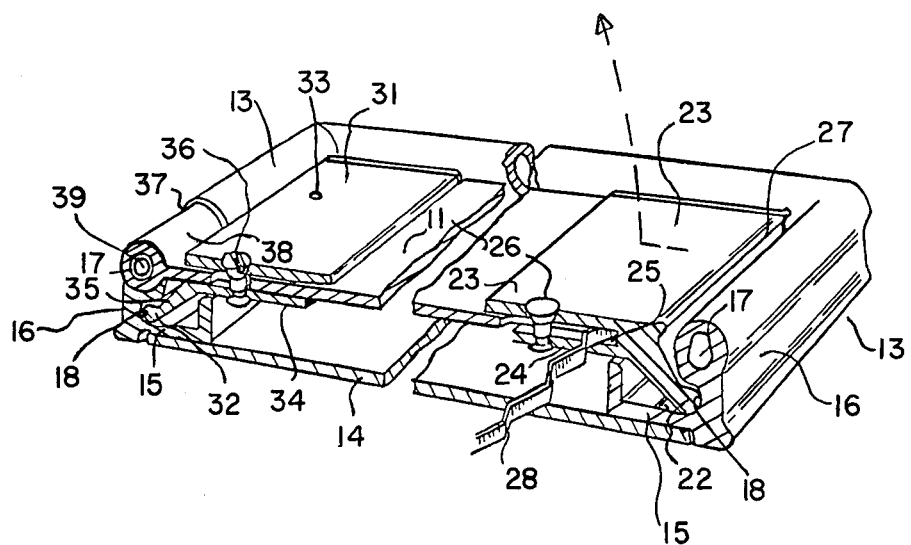

One embodiment of the invention illustrated by way of example only in the accompanying drawings, FIGS. 1 and 2, in which FIG. 1 is a plan view of a film cassette incorporating a hinge according to the invention and FIG. 2 is a sectional isometric view of the cassette of FIG. 1.

In the drawings, the cassette essentially comprises a front 10 and back 11, hinged on the left-hand side by means of a hinge mechanism according to the invention. The front comprises a peripheral frame member 13 which supports a plate 14 completing the front of the cassette. This peripheral frame member 13 includes horizontal and upstanding portions 15 and 16 respectively, the portion 16 being formed hollow at its uppermost part with a bore 17 extending therethrough, the hollow part having a curved external surface. Portions 15 and 16 define an internal radiussed recess 18 therebetween.

The back 11 is formed for convenience in a number of parts which cooperate to provide a closure for the cassette. At the hinged (left-hand) side, back portion 11 is joined to parts 34 and 31 of a hinge extrusion by means of rivets 33, the back portion 11 thereby being clamped between parts 31 and 34. Part 34 is integral with a flange 32 which is rounded at its extremity to present a curvature substantially complementary to that of recess 18. The flange 32 is also radiussed at 35, this radius being complementary to that of the curved surface of frame member 13.

Sections 37 are cut out of frame member 13 to accommodate hinge ties 38, which ties are secured within the cut-out sections 37 by at least one hinge pin 39 accommodated within the bore 17 and a corresponding bore in the hinge ties 38. The ties 38 are also secured to the parts 31, 34 of the hinge extrusion by means of screws 36 to permit the back 11 to pivot relatively to the frame member 13.

At the edge of the back opposite the hinged side, a latch arrangement is provided similar in form to the hinged side except that this side is not retained by hinge ties to the frame member. Thus the back 11 is received between and secured by means of stepped rivets 26 to parts 23 and 24 which correspond to parts 31 and 34 on the hinged side. This back 11 is received within a recess 25 between upper and lower parts 23 and 24 respectively which parts merge to provide a common flange 22 corresponding to flange 32. Parts 23, 24 and the common flange 22 together form an integral extrusion. The flange 22 is also curved for complementary accommodation within recess 18. In this instance it is unnecessary for the flange to be radiussed in a complementary manner to member 13 although for convenience the same form of extrusion as on the hinge side may be employed.

In operation from the closed position as shown in FIG. 2 the edge 27 of part 23 is engaged by the fingers and extrusion 22, 23, 24 is moved slightly to the left against the action of a schematically shown spring 28 to permit disengagement of flange 22 from recess 18. The lid may then be pivoted upwardly around hinge pin 39. During the initial part of the pivoting movement the flange 32 engages in recess 18 and the whole left hand side of back 11 is guided thereby. As the pivoting movement continues flange 22 disengages from recess 18, by which time radiussed portion 35 has engaged the curved surface of frame member 13 and is supported and guided thereon until the opening movement is completed.

Closing is achieved by the reverse operation, the back 11 dropping slightly as flange 32 engages in recess 18 to provide a flat light-tight seal along hinge and latch sides of the frame.

It should be noted that the engagement of the flange on both the hinge and latch sides permits actual locking engagement in the recess which guards against accidental opening. Such locking engagement is released by horizontal movement of the latch extrusion against the action of spring 28.

The claims defining the invention are as follows:

1. A hinge mechanism comprising first and second members, said first member being in the form of a bracket defined by a lateral limb and an upstanding limb integral therewith and defining a recess at the intersection between said limbs, the upstanding limb presenting a curved surface above said recess, said second member being movable with respect to said first member and having a projecting flange with a rounded extremity dimensioned complimentarily to seat within the recess and a web located rearwardly of said extremity and dimensioned to cooperate with the curved surface of said first member, said first and second members cooperating with one another in such manner that upon relative opening movement of said hinge members the second member has part of its movement guided by engagement of the flange extremity in the recess and a further part of its movement guided by engagement of the flange web on the curved surface of the upstanding limb of the first member.

2. A hinge mechanism according to claim 1 wherein the first and second hinge members are formed from extrusions.

3. A hinge mechanism according to claim 2 wherein the extrusions are of aluminum.

4. A hinge mechanism according to claim 1 wherein the first and second hinge members are joined together by one or more ties secured to the respective hinge members.

5. A hinge mechanism according to claim 4 wherein the first member is provided with a bore and with one or more cut-out sections which intersect the bore and which are adapted to receive a hinge tie or ties, the tie or ties being securable to the first member by means of a hinge pin or pins locatable in the bore of the first member and in an aligned bore in the tie or ties.

* * * * *